US007571242B2

United States Patent
Wilson

(10) Patent No.: US 7,571,242 B2
(45) Date of Patent: Aug. 4, 2009

(54) METHOD FOR ACCELERATED PACKET PROCESSING

(75) Inventor: David James Wilson, Kanata (CA)

(73) Assignee: Alcatel Lucent, Paris (FR)

( * ) Notice: Subject to any disclaimer, the term of this patent is extended or adjusted under 35 U.S.C. 154(b) by 871 days.

(21) Appl. No.: 10/691,515

(22) Filed: Oct. 24, 2003

(65) Prior Publication Data

US 2005/0089030 A1    Apr. 28, 2005

(51) Int. Cl.
*G06F 15/16* (2006.01)
*G08C 15/00* (2006.01)

(52) U.S. Cl. .............. 709/230; 711/118; 711/120; 709/231; 709/234; 370/231; 370/235

(58) Field of Classification Search ......... 709/238; 370/235
See application file for complete search history.

(56) References Cited

U.S. PATENT DOCUMENTS

| 5,842,040 | A | * | 11/1998 | Hughes et al. ............ 710/11 |
| 6,084,855 | A | * | 7/2000 | Soirinsuo et al. ......... 370/235 |
| 6,173,364 | B1 | * | 1/2001 | Zenchelsky et al. ....... 711/118 |
| 6,356,951 | B1 | * | 3/2002 | Gentry, Jr. ............. 709/250 |
| 6,453,360 | B1 | * | 9/2002 | Muller et al. ............ 709/250 |
| 6,483,804 | B1 | * | 11/2002 | Muller et al. ............ 709/228 |
| 7,162,529 | B2 | * | 1/2007 | Morishige et al. ........ 709/230 |
| 7,269,663 | B2 | * | 9/2007 | Beier et al. ............. 709/238 |

OTHER PUBLICATIONS

"A proposal for the IPv6 Flow Label". Conta et al. Jul. 2001. IPng Working Groups.*

"Design of Multi-field IPv6 Packet Classifiers Using Ternary CAMs". Huang et al. 2001. IEEE Global Telecommunications Conference Nov. 25, 2001. pp. 1877-1881.*

Bremler-Barr, Anat et al. "Routing with a Clue." Proceedings of the conference on Applications, techonologies, architectures, and protocols for computer communication. Aug. 1999. ACM press. 203-214.*

Neu-Fu Huang et al: "Design of multi-field IPV6 packet classifiers using ternary cams," Globecom'01. 2001 IEEE Global Telecommunications Conference, San Antonio, Tx, Nov. 25-29, 2001, IEEE Global Telecommunications Conference, New York, NY, vol. 3 of 6, Nov. 25, 2001 (pp. 1877-1881).

A. Conta at al: "A proposal for the IPv6 Flow Label, draft-conta-ipv6-flow-label-02.txt": Internet-Draft, Jul. 1, 2001, IETF, IPNG Working Group. Section 5.4-Section 5.7.2.

Jan van Lunteren et al: "Dynamic multi-field packet classification", Globecom'02. 2002—IEEE Global Telecommunications Conference. Conference Proceedings. Taipei, Taiwan, Nov. 17-21, 2002, IEEE Global Telecommunications Conference, New York, NY: IEEE, US, vol. 1 of 3, Nov. 17, 2002 (pp. 2215-2219).

(Continued)

*Primary Examiner*—Larry D Donaghue
*Assistant Examiner*—Jeffrey R Swearingen

(57) ABSTRACT

IPv6 has been developed as an evolutionary advance of IPv4. Although IPv6 offers considerable improvement in certain areas such as addressing and routing it has eliminated the Internet header length field. As a result processing of packets to obtain the upper-layer header information in which extension headers have been added can result in slower processing rates. The present invention addresses this issue by caching information relating to the length of header option fields also known as extension headers. When a flow of IPv6 packets is received and if the packet header includes extension headers a review of the cached information can avoid processing steps and hence accelerate packet processing.

12 Claims, 4 Drawing Sheets

Processing Flow Chart

OTHER PUBLICATIONS

Maria Gabrani et al: "Design methodology for a modular service-driven network processor architecture," Computer Networks, Elsevier Science Publishers B.V., Amsterdam, NL, vol. 41, No. 5, Apr. 5, 2002 (pp. 623-640).

* cited by examiner

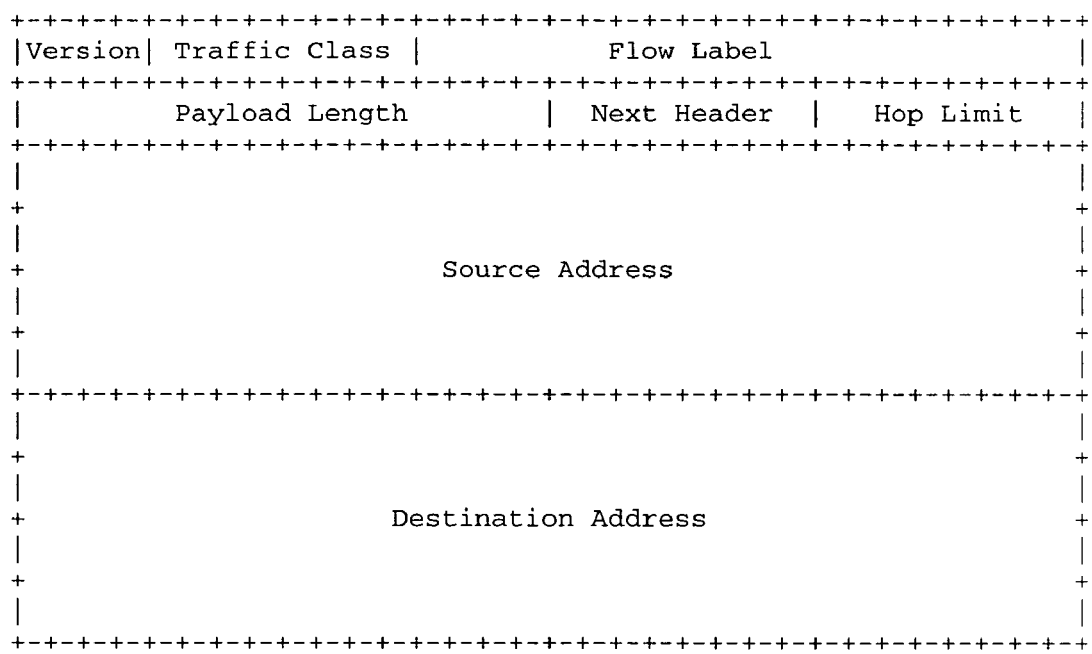
Figure 1 - IPv6 Header

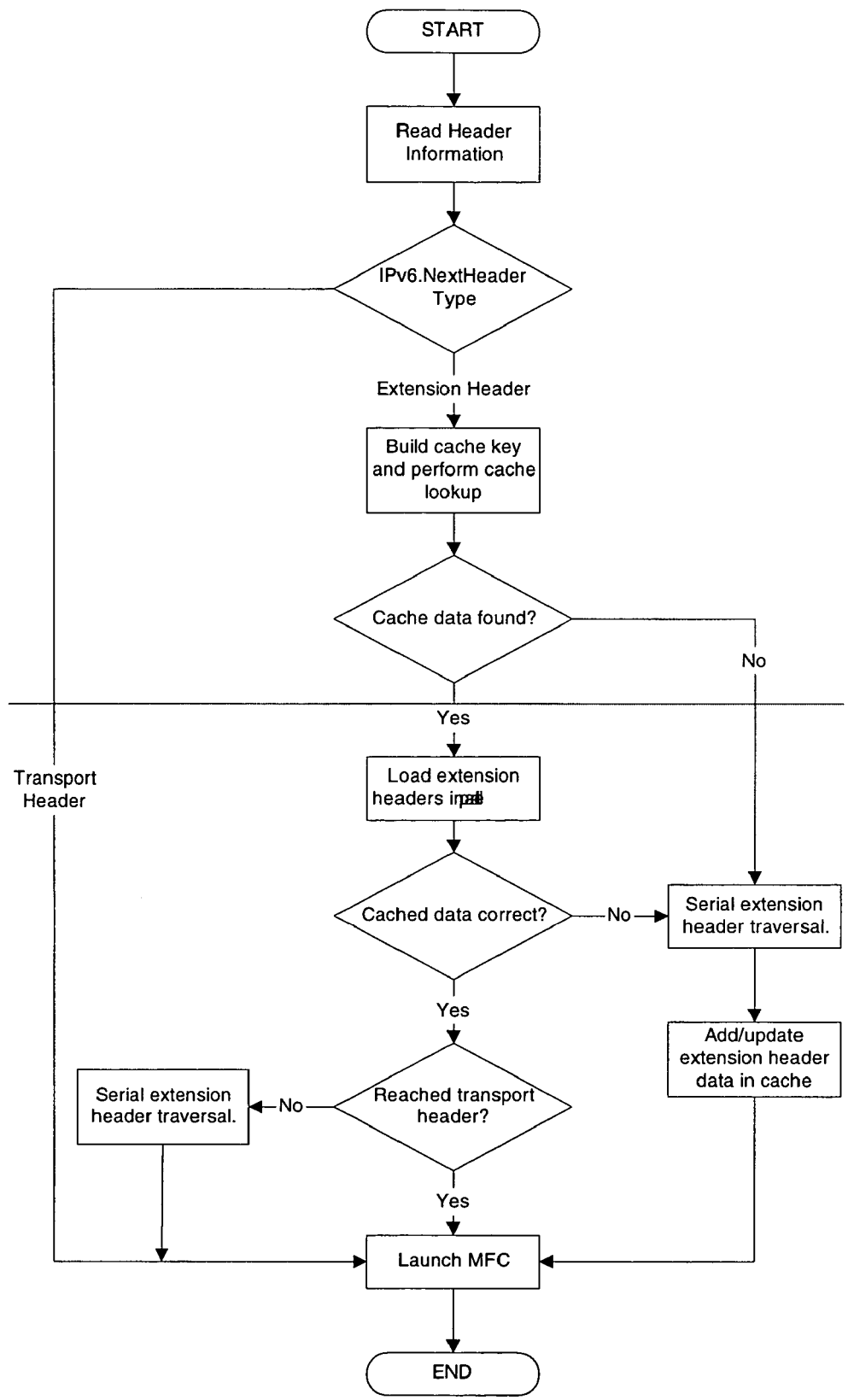
Figure 2 - Processing Flow Chart

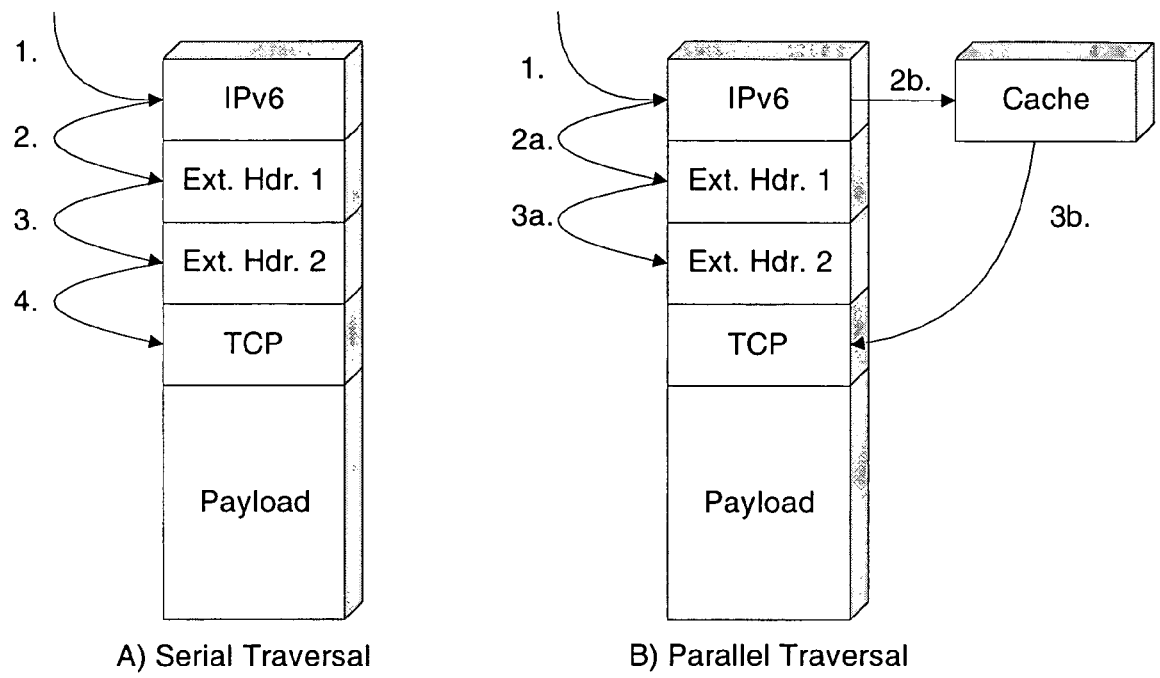
Figure 3 - Comparison of Memory Accesses

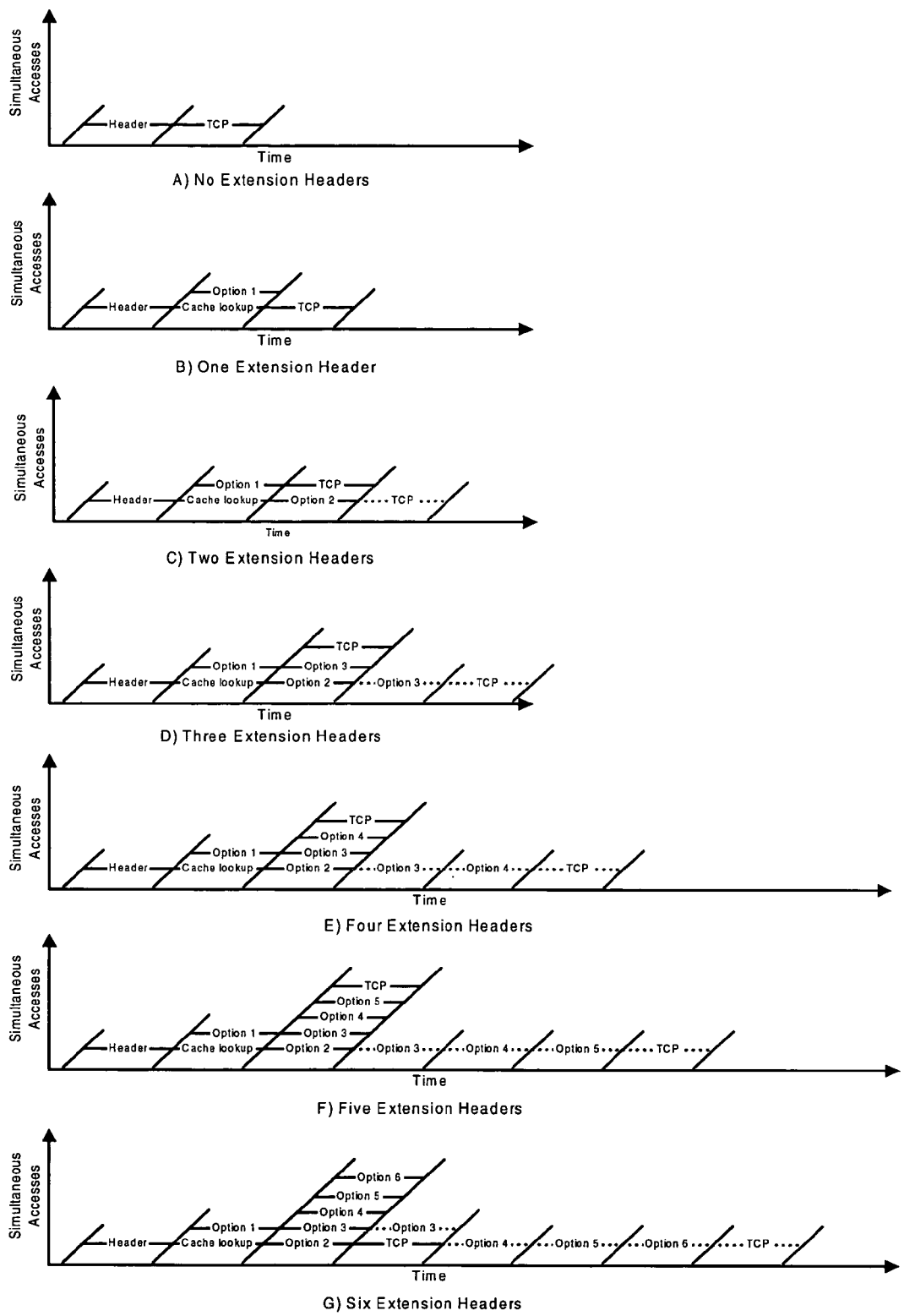
Figure 4 – Timeline of Extension Header Lookups Using Cache

METHOD FOR ACCELERATED PACKET PROCESSING

FIELD OF THE INVENTION

This invention relates to communication systems and in particular to a packet processing scheme in which a cache is used to quickly access upper-layer headers in packet flows.

BACKGROUND OF THE INVENTION

In the following discussion specific reference is made to Internet protocol version 6 (IPv6) and multi-field classification (MFC). It is to be understood, however, that the concepts of the present invention are not limited to IPv6 and MFC but the described implementation is intended as exemplary only.

IPv6 represents an evolutionary development to overcome some limitations in IPv4. In particular, the routing and addressing limitations of IPv4 place a real limit on the address configurations available based on a 32 bit field limit. IPv6 has increased the address field to 128 bits. This supports more levels of addressing hierarchy as well as a much greater number of addressable nodes. Additionally, some IPv4 header fields have been dropped to reduce the processing cost of packet handling and to limit the bandwidth cost of the IPv6 header. A new capability has been added to IPv6 which enables labeling of packets belonging to particular traffic flows for which the sender requests special handling based on quality of service or real time handling. Additionally, the mechanism to add optional internet-layer information to a packet has changed. In IPv4, this is achieved through the option field which is a part of the IPv4 header. The Internet Header Length (IHL) field in the IPv4 header indicates the length of these extra fields and the basic header. However, due to the length of the IHL field, only a limited number of options could be added to a packet. In IPv6, internet-layer information is added using extension headers. These headers are added to an IPv6 packet between the IPv6 header and the upper-layer header. Each extension header contains a field identifying the type of the next header, and instead of using a field similar to the IHL of IPv4, IPv6 specifies the length of each extension header in the extension headers themselves. This allows an unlimited number of extension headers to be added to an IPv6 packet.

FIG. 1 shows the IPv6 header format including the flow label field.

Regular packet processing typically requires fields from upper-layer headers. Multi-Field Classification (MFC), one of many examples of processing such data, usually classifies packets based on the 5-tuple <Source IP, Destination IP, Source Port, Destination Port, Protocol>. When options or extension headers are used, it can become difficult and costly to reach the upper-layer header in order to retrieve the data necessary for packet processing.

For IPv4, processing packets with options is simple as the aforementioned IHL field can be used to skip over the entire IPv4 header, including any appended options, to reach the upper-layer header.

For IPv6, reaching the upper-layer header is significantly more difficult for packets containing extension headers as the IPv6 header does not have a field like the IHL in IPv4 that can be used to immediately reach the upper-layer header. One prior art solution is to traverse the extension headers serially. Since the length of each extension header is stored in the extension header itself, this appears to be the most obvious solution. Thus, IPv6 packet processing becomes costly if a number of extension header need to be traversed before the upper-layer header can be reached and regular packet processing performed. This cost seems even more unnecessary since the presence of IPv6 extension headers does not necessarily indicate that special handling is required from the node. Some extension headers contain information relevant only to the destination node, and can be completely ignored by all nodes en-route to the destination. In fact, only hop-by-hop and router extension headers are relevant to all nodes and the latter is only applicable when the arriving packet is destined for the node. Fortunately, RFC2460 specifies that hop-by-hop extension headers be the first extension header after the IPv6 header. Thus a node can quickly determine if special handling for a packet is required simply by examining the destination address and the Next Header field of the IPv6 header.

An alternative to the previous approach is to simply limit the fields used in packet classification to those from the IP header such that the upper-layer header does not need to be examined. For MFC, this reduces the standard 5-tuple classification to a 3-tuple classification. This is not a very popular option as limiting the fields used in the MFC key for IPv6 means changing the way security of the node is controlled. Thus, a new set of rules must then be developed for IPv6 simply because it is sometimes inconvenient to read all the fields from the upper-layer header. Because of this, limiting the fields used in packet classification is not considered a competing solution.

SUMMARY OF THE INVENTION

Simply stated, the present invention relates to the caching of information about the length of extension headers used within a packet flow in order to accelerate the handling of subsequent packets in the flow. In an exemplary embodiment the packet flow comprises IPv6 packets.

Therefore in accordance with a first aspect of the present invention there is provided a method of accessing upper-layer headers in a packet flow, comprising the steps of: responsive to a packet containing extension headers, building a cache key based on the fields present in the header and performing a cache lookup for a cache entry; and responsive to finding a corresponding cache entry, reading extension headers in parallel using the cache entry to arrive at and read fields in the upper-layer header.

In accordance with a second aspect of the present invention there is provided a system for performing MFC for filtering a packet flow, comprising: means responsive to an IPv6 packet header containing extension headers, for building a cache key based on the fields present in the header and performing a cache lookup for a cache entry; and means responsive to finding a corresponding cache entry, for reading extension headers in parallel using the cache entry to arrive at and read fields in the upper-layer header.

BRIEF DESCRIPTION OF THE DRAWINGS

The invention will now be described in greater detail with reference to the attached drawings wherein:

FIG. 1 illustrates the IPv6 header format;

FIG. 2 illustrates the sequence of operations needed to reach the upper-layer header of an IPv6 packet;

FIGS. 3A and 3B show a comparison of memory accesses using serial and plural processing and FIGS. 4A to 4G illustrate time lines of extension header lookups using options.

DETAILED DESCRIPTION OF THE INVENTION

When a node receives a packet, the IPv6 header will be examined. Packets which have no extension headers will be handled using regular packet handling techniques. This means that the only additional cost for processing these packets is the check for extension headers. For packets with the hop-by-hop extension header, or packets destined to the node containing routing headers, the special handling specified by the header can be launched at this point.

For packets with extension headers the node will use the information contained in the IPv6 header to build a key in order to perform a cache lookup. The format of this key could be the same for all packets, or could be based on the presence or value of fields in the IPv6 header. For example, for packets with non-zero flow labels the tuple <IPv6.srcIP, IPv6.flowLabel>, or <IPv6.srcIP, IPv6.flowLabel, IPv6.nextHeader> could be used. For packets with a zero flow label the tuple <IPv6.srcIP, IPv6. dstIP> or <IPv6.srcIP, IPv6. dstIP, IPv6.nextHeader> could be used.

While the cache lookup is executing, the information from the header can be used to read the first extension header in the list. If no entry is found in the cache the node proceeds to traverse the list of extension headers serially using the extension header length and next header fields of the extension headers. After a serial traversal, the data used to traverse the extension headers is placed in the cache in anticipation of more packets in the same flow with similar extension headers. However, if a cached entry is found, the node uses the information from the first extension header and the cached data to read each of the remaining extension headers in parallel. This allows the node to quickly traverse the extension headers and it will either arrive at the upper-layer header, or, in the event that not enough data was cached, continue with a serial traversal of the final extension headers. If the cached data is found to be incorrect at any point in the parallel traversal of the extension headers, the node must traverse the remaining extension headers serially from the point at which the data was incorrect. In this case the cache would be updated to reflect the extension headers in the current packet in anticipation of additional packets in the same flow with similar format.

FIG. 2 summarizes the algorithm described above. It should be noted that, if after reading the IPv6 header it is known that there are no extension headers in the packet then no cache lookup is performed. Thus, in cases where there are no packets using extension headers there will be only a small, if any, penalty for implementing these optimizations.

FIG. 3 shows the difference in the memory accesses between traversing the extension header linked list and using the accelerated algorithm. In the case shown, the packet processing latency is reduced by one memory access. FIG. 3A shows the memory accesses used in a serial traversal of the header. As shown in FIG. 3B the parallel processing involves at step 2B an examination of the cache in parallel with the review of the first extension header.

There are several alternate embodiments to the invention. The first embodiment is the ability to identify, and react to "unpredictable" flows. This would be used to detect flows in which the extension headers were constantly changing. If such a flow were identified, it would be clear that the cached data would likely be incorrect, and that it would be more efficient to traverse the extension headers serially, instead of attempting a parallel traversal. Additionally, for such a flow, updating the cache to reflect the format of the current packet would be unnecessary. Marking a flow as "unpredictable" could be the result of manual configuration or determined dynamically based on observing the flow.

The second embodiment is to have the ability to specify a cache entry as "sticky". This would indicate that the majority of the packets in a flow should be correctly interpreted using the cached data, and that in the event that the cached data does not match the packet the cache should not be updated. This would prevent a single packet from changing the cached data. As in the previous extension, this feature could be manually enabled or enabled as a result of flow observations. This extension could be enhanced by specifying that in the case of cache failures, the data in the cache would only be updated after a certain number of failures.

A third embodiment is to also cache some of the upper-layer header information such as the protocol and the source and destination ports. When the cached information is received, the protocol information, combined with the information contained in the IPv6 header, can be used to immediately begin packet classification, such as MFC. While the classification is completing, the remaining cached information can be used to quickly traverse the extension headers and to verify that the cached protocol information matches that of the packet. If the two sets of information match then the classification is valid. If, however, the information from the cache is incorrect, classification needs to be repeated with the correct information from the upper-layer header. In the worst case, there is a cost of one additional classification, but in the best case this allows for packet classification to be done in parallel with the extension header traversal and can reduce the total packet processing latency by the latency required for packet classification.

A still further embodiment is the ability to cache the results of other classifications and lookups performed during regular packet processing. For example, the result of the MFC, and forwarding lookups could be added to the cache. Using this embodiment, only the first packet in a flow needs to be fully classified as subsequent packets in the flow are able to use the results of this classification from the cache.

The present invention provides advantages over the previously discussed prior art solutions. As a large portion of extension headers require no special processing by most nodes, the present invention reduces the cost associated with processing IPv6 packets containing extension headers. This allows the upper-layer headers to be quickly reached such that packet processing can continue.

With respect to the use of existing MFC tuples, since the upper-layer header can be quickly located, the fields used in packet classification can remain unchanged with respect to those which were used for IPv4. This means that existing security policies can be applied to IPv6 in the same manner as they were in IPv4.

The cost of loading extension header information in parallel may results in a small increase in total memory bandwidth due to the need to read the data from the cache, but this increase will only occur for packets which contain extension headers.

FIG. 4 shows the timelines for the parallel loading of up to six extension headers. The solid bars indicate the best case traversal of the extension headers. The dashed bars show the absolute worst case traversal of the extension headers in the event that the cached information is incorrect. It can be seen from FIGS. 4A to 4G that in the best case traversal of the extension headers considerable time is saved from the process involving serial header lookups as indicated by the dashed bars.

The cache can be implemented in any number of ways. Possible implementations include the use of a context addressable memory (CAM) or through the use of hash tables. Perhaps the most obvious method is to use an existing CAM. Using the CAM as a cache has its advantages and disadvantages. The main advantage is that with a CAM is that most, if not all, the bits from the key can be used to perform a lookup resulting in very low or no chance, depending on the exact implementation, for there to be a collision when matching a key. This means there will be a very few mismatches due to obtaining the wrong information from the CAM. The downside to a CAM implementation, apart from the fact that CAMs are expensive and constrained by space, is that the CAM lookup may require two memory accesses to do a cache lookup. The first access, a write, provides the CAM with the key and the instruction to perform a lookup. The second access, a read, retrieves the result from the CAM.

As an alternative to using the CAM a hash table can be used to implement the cache. This implementation has certain advantages since it does not consume precious and costly CAM space. Due to the speed that a hash lookup can be performed, this implementation is likely at least as fast, and certainly less costly, as the CAM implementation. The downside to the hash implementation is that there is a greater probability for a collision when matching a key compared to the CAM implementation.

Depending on exactly how the cache is implemented, it may be possible for a collision to occur when matching a key. This is the result of not using all of the bits of the key as an index into the cache. The effect is that further processing may be required to resolve this collision. It may be that in certain implementations, the cost of resolving these collisions is greater than the cost of serially traversing the extension headers due to incorrect cache information. In these cases, it would be beneficial to simply assume that collisions do not occur. The end result would be an increase in the frequency of cache and packet data mismatch, but an overall reduction in processing. For hash implementations, this has the additional benefit of reducing the size of the hash table entries as the information that was needed to resolve collisions is no longer needed. The reduction in hash table entry size effectively increases the number of entries in the table, or allows for memory savings.

As discussed previously, the caching method uses fields from the header in order to build a key to index into the cache. The information stored in the cache is a duplication of the information believed to be in the packet. Because of this duplication, care must be taken to ensure that the cached data matches the data in the packet. In order to do this, at a minimum the lengths of the extension headers must be cached so that the extension headers can be loaded to confirm they match the cached data. If this validation were not performed it would be possible for a malicious host to establish a valid flow, but modify subsequent packets in the flow in order to bypass some security mechanism. As an example, assume an implementation that simply caches the total length of all extension headers. When the first packet, containing many extension headers, in the flow arrives the extension headers are traversed serially, and an entry is added to the cache. MFC is performed on the packet, and the packet is accepted. Another packet in the flow arrives, and the cached data is read. The total extension header offset is used to read what is believed to be the upper-layer header, but which actually a fake header identical to that of the first packet. MFC is performed, and the packet is accepted. Had the extension headers been read serially it would have been clear that this second packet had fewer extension headers that the first packet, and that the real upper-layer header was located earlier in the packet than the one pointed to by the cached data.

Although particular embodiments of the invention can be described and illustrated it will be apparent to one skilled in the art that numerous changes can be made without departing from the basic concept of the invention. It is to be understood, however, that such changes will fall within the full scope of the invention as defined by the appended claims.

The invention claimed is:

1. A method of accessing a transport header of packets having extension headers, wherein the packets belong to a particular traffic flow, the method comprising:
   reading header information from the packets;
   building a cache key from said header information;
   using said cache key to perform a cache lookup;
   adding an unpredictable flow mark to the particular traffic flow when said extension headers are constantly changing;
   when the particular traffic flow has the unpredictable flow mark performing a serial traversal of said extension headers; and
   when the particular traffic flow does not have the unpredictable flow mark, storing data read from said extension headers in said cache; and
   when extension header data are found in said cache, using said extension header data to load said extension headers in parallel in order to reduce a time required to traverse said extension headers.

2. The method defined in claim 1, wherein the packets are IPv6 packets.

3. The method defined in claim 1, further comprising:
   building said cache key from two fields of an Internet header of the packets.

4. The method defined in claim 3, wherein:
   the two fields used to build the cache key are an IP source address field and a flow label field for packets that have a flow label, and
   an IP source field and a destination address field for packets that do not have a flow label.

5. The method defined in claim 1, wherein the cache key is built from a source address, a flow label, and a next header for a packet that has a flow label, or from a source address, a destination address, and a next header for a packet that does not have a flow label.

6. The method defined in claim 1, further comprising:
   performing the cache lookup using a table containing lengths of said extension headers.

7. The method defined in claim 1, wherein said extension headers include a first extension header and additional extension headers, and further comprising:
   reading said first extension header while said cache lookup is being performed on said additional extension headers.

8. The method defined in claim 1, further comprising:
   when a subsequent packet has a same cache key but additional extension headers, serially traversing said additional extension headers and updating said extension header data by storing additional extension header data.

9. The method defined in claim 1, further comprising:
   detecting whether the packets include hop-by-hop and routing extension headers.

10. The method defined in claim 1, further comprising:
    when a subsequent packet has a same cache key as a packet for which extension header data are stored in said cache but the extension header data do not match extension headers in the subsequent packet, performing a serial traversal of said extension headers in the subsequent packet.

11. A method of accessing a transport header of packets having extension headers, wherein the packets belong to a particular traffic flow, the method comprising:
- reading header information;
- building a cache key from said header information;
- using said cache key to perform a cache lookup;
- adding an unpredictable flow mark to the particular traffic flow when said extension headers are constantly changing;
- when extension header data are not found in a cache:
  - incrementing a cache failure count,
  - performing a serial traversal of said extension headers, and
  - storing data read from said extension headers in said cache when said cache failure count exceeds a predetermined threshold and the particular traffic flow does not have the unpredictable flow mark; and
- when extension header data are found in said cache, using said extension header data to load said extension headers in parallel in order to reduce a time required to traverse said extension headers, when the particular traffic flow does not have the unpredictable flow mark.

12. A method of accessing a transport header of packets having extension headers, wherein the packets belong to a particular traffic flow, the method comprising:
- reading header information;
- building a cache key from said header information;
- using said cache key to perform a cache lookup;
- adding an unpredictable flow mark to the particular traffic flow when said extension headers are constantly changing;
- classifying the packets while verifying that cached protocol information matches the packets;
- when said verifying fails, performing said classifying again with information from an upper-layer header of the packets;
- when no extension header data are found in a cache, performing a serial traversal of said extension headers, and storing data read from said extension headers in said cache when the particular traffic flow does not have the unpredictable flow mark; and
- when extension header data are found in said cache, using said extension header data to load said extension headers in parallel in order to reduce a time required to traverse said extension headers when the particular traffic flow does not have the unpredictable flow mark.

* * * * *